United States Patent
Gibbon et al.

(10) Patent No.: US 10,812,875 B2
(45) Date of Patent: *Oct. 20, 2020

(54) METHOD AND APPARATUS FOR GENERATING INFORMATION ASSOCIATED WITH A LAPSED PRESENTATION OF MEDIA CONTENT

(71) Applicant: AT&T Intellectual Property I, L.P., Atlanta, GA (US)

(72) Inventors: David Crawford Gibbon, Lincroft, NJ (US); Lee Begeja, Gillette, NJ (US); Raghuraman Gopalan, Dublin, CA (US); Zhu Liu, Marlboro, NJ (US); Bernard S. Renger, New Providence, NJ (US); Behzad Shahraray, Holmdel, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,462

(22) Filed: Jun. 26, 2018

(65) Prior Publication Data

US 2018/0302695 A1 Oct. 18, 2018

Related U.S. Application Data

(63) Continuation of application No. 15/704,041, filed on Sep. 14, 2017, now Pat. No. 10,034,065, which is a
(Continued)

(51) Int. Cl.
*H04N 21/8549* (2011.01)
*H04N 21/234* (2011.01)
(Continued)

(52) U.S. Cl.
CPC ... *H04N 21/8549* (2013.01); *H04N 21/23418* (2013.01); *H04N 21/23424* (2013.01);
(Continued)

(58) Field of Classification Search
None
See application file for complete search history.

(56) References Cited

U.S. PATENT DOCUMENTS 6,219,837 B1 4/2001 Yeo et al.
6,829,781 B1 12/2004 Bhagavath et al.
(Continued)

FOREIGN PATENT DOCUMENTS

JP 2000339857 8/2000
JP 2001156664 A 6/2001

OTHER PUBLICATIONS

Gong, Yihong et al., "Generating Optimal Video Summaries", C&C Research Laboratories, NEC USA, Inc., 2000.
(Continued)

*Primary Examiner* — Jason K Lin
(74) *Attorney, Agent, or Firm* — Guntin & Gust, PLC; Mark Wilinski

(57) ABSTRACT

Aspects of the subject disclosure may include, for example, facilitating access to a synopsis of a missed portion of a media program, identifying subject matter in a segment of content in the media program that has not been presented, determining a particular time for presenting the summary according to the subject matter in the segment of content, and initiating a presentation of the summary at the particular time. Other embodiments are disclosed.

20 Claims, 7 Drawing Sheets

Related U.S. Application Data continuation of application No. 14/080,920, filed on Nov. 15, 2013, now Pat. No. 9,807,474.

(51) Int. Cl.
  *H04N 21/262* (2011.01)
  *H04N 21/44* (2011.01)
  *H04N 21/266* (2011.01)
  *H04N 21/235* (2011.01)

(52) U.S. Cl.
  CPC ... *H04N 21/2625* (2013.01); *H04N 21/26241* (2013.01); *H04N 21/26283* (2013.01); *H04N 21/26603* (2013.01); *H04N 21/44008* (2013.01); *H04N 21/44016* (2013.01); *H04N 21/235* (2013.01)

(56) References Cited

U.S. PATENT DOCUMENTS

| | | |
|---|---|---|
| 7,055,166 B1 | 5/2006 | Logan et al. |
| 7,080,392 B1 | 7/2006 | Geshwind |
| 7,127,735 B1 | 10/2006 | Lee et al. |
| 7,203,620 B2 | 4/2007 | Li |
| 7,242,849 B2 | 7/2007 | Okada |
| 7,310,589 B2 | 12/2007 | Li |
| 7,421,455 B2 | 9/2008 | Hua et al. |
| 7,493,639 B2 | 2/2009 | Lawler et al. |
| 7,548,565 B2 | 6/2009 | Sull et al. |
| 7,738,778 B2 | 6/2010 | Agnihotri et al. |
| 7,853,865 B2 | 12/2010 | Errico et al. |
| 8,020,183 B2 | 9/2011 | Ferman et al. |
| 8,181,215 B2 | 5/2012 | Brenner et al. |
| 8,479,238 B2 | 7/2013 | Chen et al. |
| 8,555,332 B2* | 10/2013 | Brown .................. H04M 7/123 725/106 |
| 9,094,738 B2 | 7/2015 | Kishore |
| 2002/0083459 A1 | 6/2002 | Kondo et al. |
| 2002/0083471 A1 | 6/2002 | Agnihotri et al. |
| 2002/0170068 A1 | 11/2002 | Rafey et al. |
| 2003/0025832 A1 | 2/2003 | Swart et al. |
| 2003/0037068 A1 | 2/2003 | Thomas et al. |
| 2003/0154479 A1 | 8/2003 | Brenner et al. |
| 2003/0172381 A1* | 9/2003 | Janevski ................ H04N 7/163 725/46 |
| 2004/0078829 A1* | 4/2004 | Patel ..................... G06F 3/0482 725/135 |
| 2005/0097621 A1 | 5/2005 | Wallace et al. |
| 2006/0107302 A1 | 5/2006 | Zdepski |
| 2006/0195583 A1 | 8/2006 | Bellifemine et al. |
| 2007/0101369 A1* | 5/2007 | Dolph .............. H04N 21/23106 725/46 |
| 2007/0157237 A1 | 7/2007 | Cordray et al. |
| 2007/0157249 A1 | 7/2007 | Cordray et al. |
| 2009/0119704 A1 | 5/2009 | Dimitrova et al. |
| 2009/0198992 A1* | 8/2009 | Rofougaran .......... G06F 1/1632 713/2 |
| 2009/0217331 A1 | 8/2009 | Park et al. |
| 2009/0313546 A1 | 12/2009 | Katpelly |
| 2009/0327894 A1 | 12/2009 | Rakib et al. |
| 2010/0052843 A1 | 3/2010 | Cannistraro |
| 2010/0057563 A1* | 3/2010 | Rauber .................. G06Q 30/02 705/14.53 |
| 2010/0122288 A1* | 5/2010 | Minter ............... H04N 7/17318 725/36 |
| 2010/0146055 A1 | 6/2010 | Hannuksela et al. |
| 2010/0191826 A1* | 7/2010 | Tsurukiri .......... G06F 17/30017 709/217 |
| 2010/0251295 A1* | 9/2010 | Amento ............... H04N 21/475 725/38 |
| 2011/0119324 A1* | 5/2011 | Tian .................... H04N 21/4333 709/203 |
| 2011/0211813 A1 | 9/2011 | Marks et al. |
| 2012/0173624 A1* | 7/2012 | Beerse ............... H04N 21/8456 709/204 |
| 2012/0259924 A1* | 10/2012 | Patil .................... H04L 65/4076 709/206 |
| 2013/0250835 A1 | 9/2013 | Ichiki et al. |
| 2014/0082670 A1* | 3/2014 | Papish ................. H04N 21/462 725/45 |
| 2014/0309864 A1 | 10/2014 | Ricci et al. |
| 2014/0325541 A1 | 10/2014 | Hannes et al. |
| 2015/0020097 A1* | 1/2015 | Freed et al. ......... H04N 21/812 725/35 |
| 2015/0074732 A1 | 3/2015 | Green et al. |
| 2015/0264448 A1 | 9/2015 | Ji |
| 2018/0014091 A1 | 1/2018 | Gibbon et al. |

OTHER PUBLICATIONS

Ma, Yu-Fei et al., "A User Attention Model for Video Summarization", Microsoft Research Asia, 2002.

Nathan, , "CollaboraTV: Making Television Viewing Social Again", pp. 85-94, axTV'08, Oct. 22-24, 2008.

Shipman, Frank et al., "Generation of Interactive Multi-Level Video Summaries", FX Palo Alto Laboratory, Inc., 2003.

Syeda-Mahmood, Tanveer et al., "Learning Video Browsing Behavior and Its Application in the Generation of Video Previews", IBM Almaden Research Center, 2001.

Yahiaoui, Itheri et al., "Generating Summaries of Multi-Episode Video", Institut Eurécom, 2001.

\* cited by examiner

200

300

METHOD AND APPARATUS FOR GENERATING INFORMATION ASSOCIATED WITH A LAPSED PRESENTATION OF MEDIA CONTENT

CROSS-REFERENCE TO RELATED APPLICATIONS

This application is a continuation of and claims priority to U.S. patent application Ser. No. 15/704,041, filed Sep. 14, 2017, which is a continuation of and claims priority to U.S. patent application Ser. No. 14/080,920, filed Nov. 15, 2013, now U.S. Pat. No. 9,807,474. The contents of the foregoing are hereby incorporated by reference into this application as if set forth herein in full.

FIELD OF THE DISCLOSURE

The subject disclosure relates to a method and apparatus for generating information associated with a lapsed presentation of media content.

BACKGROUND

It is common for members of a household or enterprise to view media content on a shared television system. When a media program is in progress, it would be undesirable for a user to invoke a playback session with, for example, a digital video recorder that previously recorded the program, as this may interrupt the viewing of the media program by another user who is viewing the media program from the same television system and who has not missed any portion of the media program presentation.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for presenting summaries of missed media program segments. Other embodiments are included in the subject disclosure.

One embodiment of the subject disclosure includes a device having a processor, and a memory that stores executable instructions that, when executed by the processor, facilitate performance of operations, including detecting a request for a synopsis of a missed portion of a video program in progress, identifying a particular time for presenting the synopsis according to subject matter in a next segment of content that has yet to be presented in the video program, and presenting the synopsis at the particular time. In one embodiment the missed portion can be determined from a first time when the video program was initiated and a second time when the request for the synopsis is received.

One embodiment of the subject disclosure includes a machine-readable storage medium, including executable instructions which, responsive to being executed by a processor, cause the processor to perform operations including detecting a request for a synopsis of a missed portion of a media program, identifying subject matter in a segment of content in the media program that has not been presented, determining a particular time for presenting the synopsis according to the subject matter in the segment of content, and initiating a presentation of the synopsis at the particular time.

One embodiment of the subject disclosure includes a method for generating, by a system comprising a processor, a summary of a missed portion of a media program, identifying, by the system, subject matter in a next segment of content in the media program that has not been presented, determining, by the system, a particular time for presenting the summary according to the subject matter in the next segment of content, and initiating, by the system, a presentation of the summary at the particular time.

Figure 1:
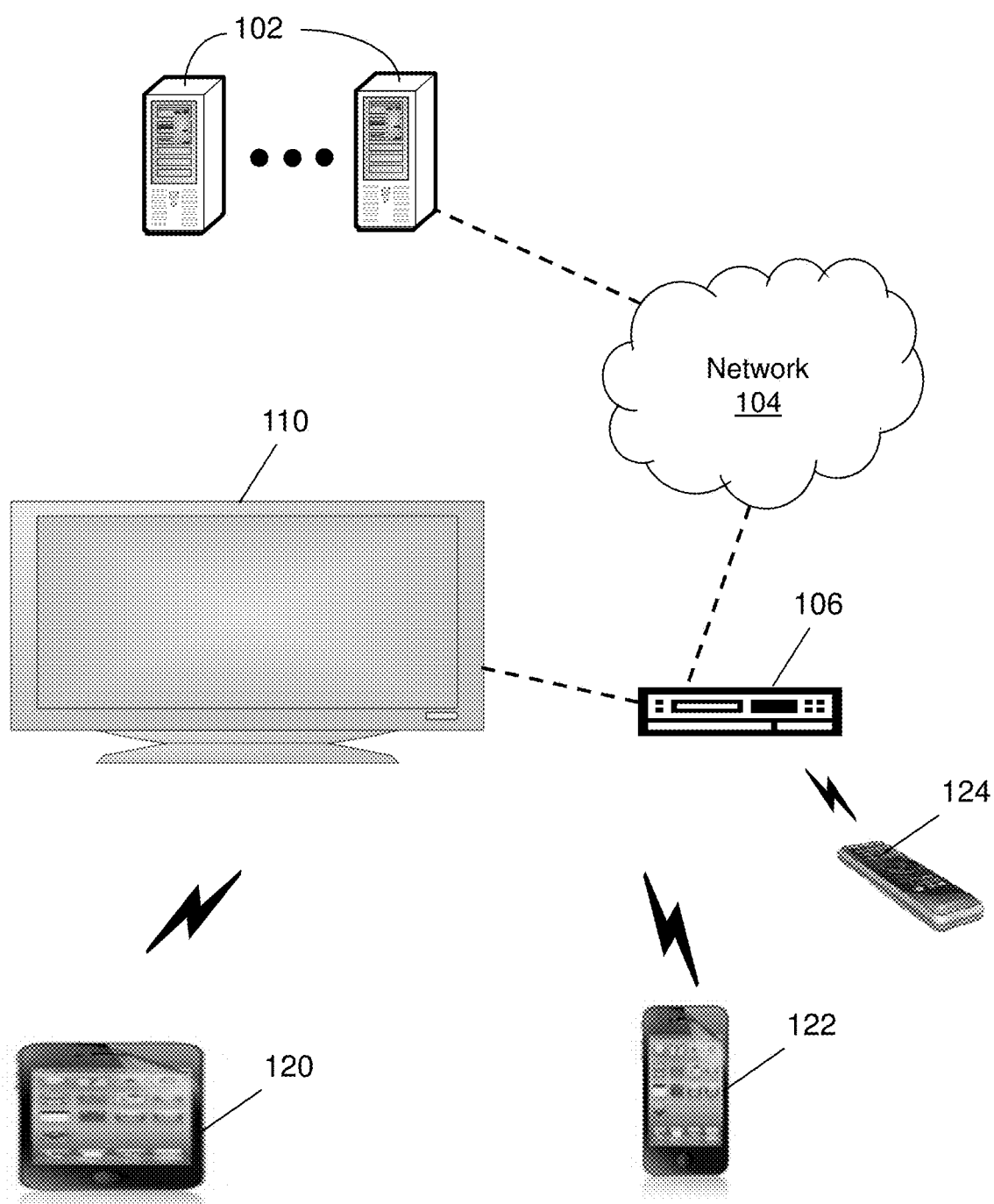
FIG. 1 depicts an illustrative embodiment of a system for presenting media content.

FIG. 1 depicts an illustrative embodiment of a system 100 for presenting media content. The system 100 can comprise a set-top box 106 communicatively coupled to a television 110 and a communication network 104. The communication network 104 can also be communicatively coupled to one or more servers 102 that provide summary or synopsis services to portable communication devices used by subscribers of the service. The portable communication devices can be a tablet 120 or smart phone 122 as shown in FIG. 1 communicatively coupled to the servers 102 by way of a wireless communication link between the set-top box 106 and the tablet 120 or smart phone 122. The wireless link can be a wireless fidelity (WiFi) link, a Bluetooth link, or other suitable wireless link technologies. The set-top box 106 can also be controlled by a remote controller 124 or by remote control software applications executed by the tablet 120 or smart phone 122. Alternatively, the functions provided by set-top box 106 and television 110 can be combined into a single physical device, e.g., a smart TV or a connected TV. The function provided by television 110 can also be implemented by a video wall which may include multiple individual displays arranged in a matrix.

Figure 2:
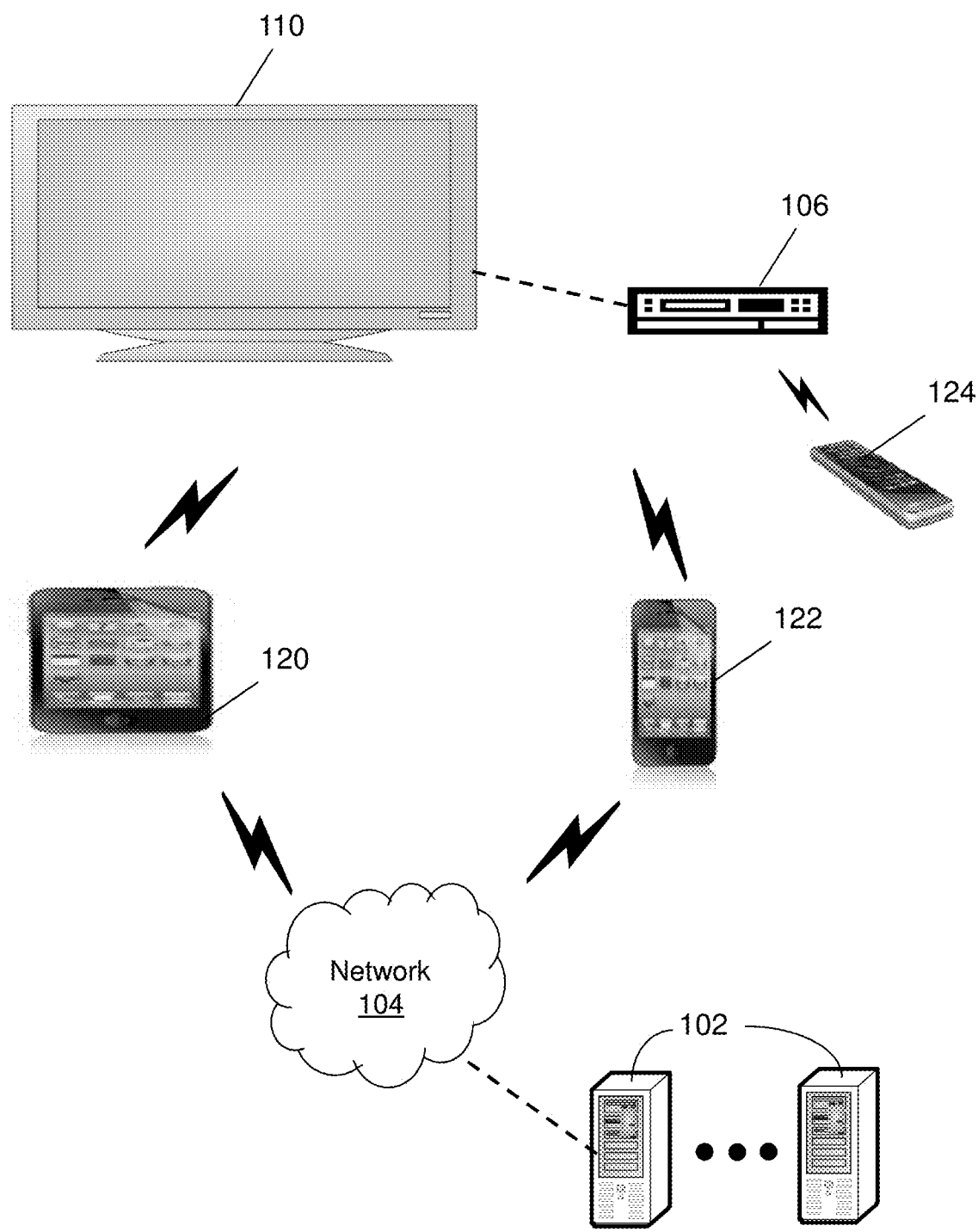
FIG. 2 depicts an illustrative embodiment of a system for presenting media content.

FIG. 2 depicts another illustrative embodiment of a system 200 for presenting media content. In the embodiment of system 200, the tablet 120 and smart phone 122 can be communicatively coupled to the set-top box 106 over a first wireless link (e.g., WiFi), and can also be communicatively coupled to the communication network 104 over a second wireless link (e.g., LTE). In this embodiment, the tablet 120 and the smart phone 122 can receive summary/synopsis services from the servers 102 over the communication network 104 without assistance from the set-top box 106.

Figure 3:
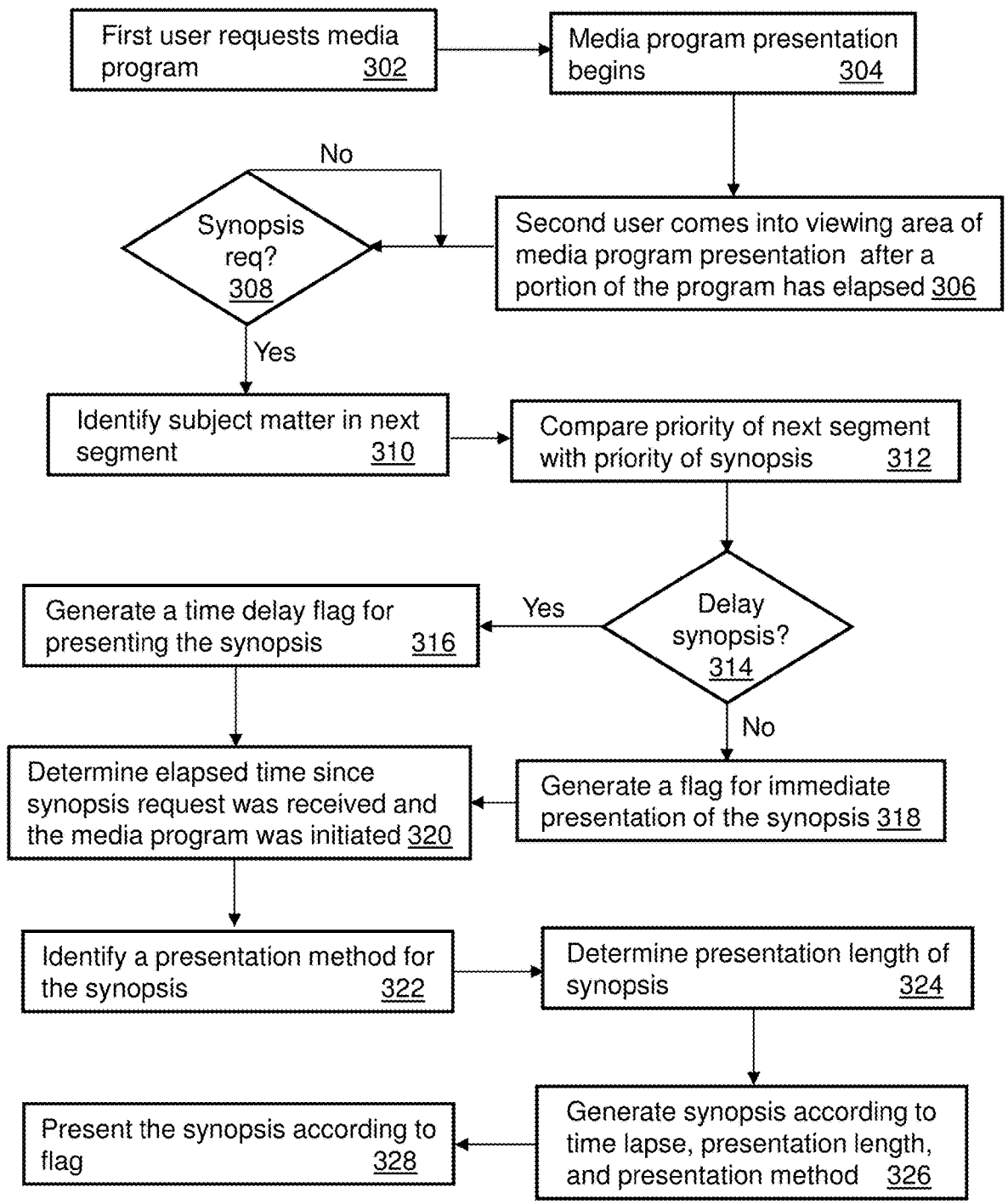
FIG. 3 depicts an illustrative embodiment of a method operating in portions of the system described in FIGS. 1-2.

FIG. 3 depicts an illustrative embodiment of a method 300 operating in portions of the systems 100-200 described in FIGS. 1-2. Method 300 can begin with step 302 in which a first user requests a media program by manipulating, for example, the remote controller 124. The media program can be a scheduled television program, a video on demand movie download, or other suitable forms of media content provided by the set-top box 106. At step 304, the media program presentation begins at television system 110. At step 306 a second user comes into a viewing area of the media program after a portion of the media program has elapsed ("a missed portion"). The second user may determine that s/he would like to view the same program, but would like to receive a synopsis of the program in a manner that does not interrupt the viewing of the media program by the first user. To accomplish this, the second user can initiate a synopsis request at step 308 by selecting a function on his/her portable communication device such as a "synopsis button" on a graphical user interface presented on a display of the portable communication device.

Alternatively, the portable communication device can be configured to automatically detect the set-top box 106, request information (e.g., descriptive metadata) on what's being presented, and an indication of how much time has elapsed since the media program presentation was initiated. The portable communication device can then compare the program genre and/or program identity to user preferences to determine if this would be a media program desirable for viewing by the second user. If the media program is determined to be desirable, the portable communication device can be configured to present the second user a graphical user interface that prompts the second user to accept or decline an option to request a synopsis. In another embodiment, when the media program is determined to be desirable, the portable communication device can submit the request for a synopsis to the servers 102 via the set-top box 106 (or directly via the network 104 as in FIG. 2) without prompting the second user.

In yet another embodiment, the portable communication device can be configured to determine a trajectory of the portable communication device and an arrival time of the portable communication device at a premises of the second user (or enterprise), and anticipate based on historical data collected by the portable communication device that a scheduled media program of interest to the second user has already started before the second user's arrival. In this embodiment, the portable communication device can be configured to prompt the user, or automatically request the synopsis of the program from the servers 102.

In one embodiment, when a synopsis request is detected by the set-top box 106 at step 308, the set-top box 106 can proceed to step 310 to analyze the subject matter in the next segment of the media program that has yet to be presented. The analysis can reveal that the next segment includes subject matter that would be considered by the second user as important (e.g., a car chase). Such a determination can be made by obtaining metadata included in the media program stream on the same channel as the media program (or a different channel) and comparing the metadata to preferences included in a user profile of the second user. The metadata can also designate certain segments as popular "must see" segments. Must see segments can be identified by the authors or producers of the media program. Alternatively, metadata can also identify an upcoming advertisement segment which can be used for presenting the synopsis. Similarly, metadata can also identify a segment as having less viewing significance than "must see" segments. The metadata can also provide priority levels to identify the desirability of viewing a segment. It is also noted that the set-top box 106 can forward a synopsis request to the servers 102, which can analyze the next segment as described above. If the metadata is not available, automated video summarization methods based on analysis of the motion activity, audio content, etc., can be employed to estimate which segments are 'must see' segments.

At step 312 the set-top box 106 (or servers 102) can compare the presentation priority of the next segment to the presentation priority of the synopsis. The presentation priority of the synopsis can be determined by, for example, the length of time of the missed portion. The longer the missed portion is, the more important it is to provide the synopsis to the second user as soon as possible so that the second user can understand what has transpired in the missed portion and how it relates to what is now being presented. Thus the priority assigned to the synopsis can be weighted by the duration of the missed portion. Additionally, the priority can be determined by an analysis of the transpired segments in the missed portion and the priorities given to those segments.

At step 314, the set-top box 106 (or servers 102) can determine if the synopsis presentation should be delayed according to the comparison performed in step 312. For example, if the priority given to the synopsis is reasonably higher than the priority given to the next segment, then the set-top box 106 (or servers 102) can be configured to decide not to delay a presentation of the synopsis. Alternatively, if the next segment is a "must see" segment and an advertisement segment follows this segment, then a determination can be made that delaying the presentation of the synopsis until the advertisement segment would be appropriate. In yet another embodiment, if the next segment has a higher priority than the synopsis, then a determination can be made that delaying the presentation of the synopsis until after the next segment would be appropriate. In another embodiment, where the next segment has a lower priority than the synopsis segment, then a determination can be made that the synopsis should not be delayed. The set-top box 106 (or servers 102) can be configured with any number of conditions to assess when it would be appropriate to delay or present the synopsis as soon as possible.

If a delay is determined, at step 316 the set-top box 106 (or servers 102) can generate a time delay flag that identifies a time for delivering the synopsis. If no delay is determined, at step 318 the set-top box 106 (or servers 102) can generate a different flag that identifies an immediate delivery of the synopsis. At step 320 the set-top box 106 (or servers 102) can also determine the elapsed time since the media program was initiated and the synopsis request was received. At step 322, the set-top box 106 (or servers 102) can also make a determination as to a presentation type to be used for the synopsis. The presentation type can be audio only, text only, video only, still image(s) only, thumbnails only, or any combination thereof. In yet another embodiment, the set-top box 106 can pause the display while the summary is being observed.

The presentation type can be determined from known impairments of the second user (e.g., color blind, hearing impaired, visually impaired, etc.). For example, the presentation type may be text only if the second user has a hearing impairment. The presentation type can also be determined from preferences of the second user. For example, the user may desire not to receive a synopsis that includes audio to avoid disturbing other users viewing the program. The presentation type can also be determined from the resources of the portable communication device submitting the synopsis request. For example, if the portable communication device cannot provide a video presentation, then the presentation type can be limited to the resources of the portable communication device (e.g., text, still images and/or audio). The state of the device may also be taken into account when determining how the synopsis should be presented. For example, if there are headphones inserted into the device, then the synopsis may include audio since it will not disturb other users viewing the program in this case.

Once the presentation type is determined, the set-top box 106 (or servers 102) can further determine from the elapsed time of the missed portion, and the presentation type an estimated length for presenting the synopsis. Generally, the synopsis should be as short as possible so that the second user can quickly assimilate what has transpired and experience the rest of the programming with minimal delay. Since the length of the synopsis cannot be zero, the set-top box 106 (or servers 102) can at step 326 account also for an "additional" missed portion due to the time it will take the second user to review the synopsis. The time estimated for reviewing the synopsis, plus the elapsed time of the missed portion can be used by the set-top box 106 (or servers 102) to generate a synopsis at step 326 that covers the missed portion and the addition portion that will be missed while reviewing the synopsis.

The synopsis can be constructed from synopsis content created by the media content authors or service provider of the media content before the media content is released to the general public. For example, the media content authors or service providers can analyze media content at various segments and generate a database of synopsis data which can be indexed according to segment count and which can be in the form of audio descriptions, text descriptions, compact video and still image descriptions, and so on, all of which can be selectively chosen according to the presentation type determined at step 322. The set-top box 106 (or servers 102) can, for example, construct a synopsis according to the elapsed time which can be used to identify a number of expired segments and the review time of the synopsis which identifies an additional missed portion.

For live programs, such as sports programs, synopsis information can be created in real-time during the presentation of the game and stored in a database for later retrieval for use when synopsis requests are received by the set-top box 106 (or servers 102). Since some live programs are buffered by the service providers, a part of the synopsis can be constructed with a limited future description to account for the synopsis review time. Additionally, for live broadcasts, an anticipated advertisement slot can also be used to delay the synopsis and thereby reduced or eliminate an additional missed portion.

Once the synopsis has been created, it can be presented according to one of the flags of steps 316 or 318. If a delay is determined, the set-top box 106 will delay presentation of the synopsis until a particular time identified by the flag (e.g., the beginning of an advertisement or a segment following a "must see" segment). If the flag indicates no delay is determined, then the synopsis is presented immediately. To avoid interrupting a viewing by the first user of the media program at the television system 110, the synopsis can be presented at a second display particularly the display of the portable communication device used by the second user.

In another embodiment, the second user may desire an in-depth look at some of the missed content for more background or understanding of the content's history. For example, if a television program on display 110 was episode 15 of a series, the second user may desire a synopsis that includes background information from episode 1-14. The second user can specify this desire through their profile (must be kept abreast of all prior content), through an interactive interface on his or her device (e.g. 120, 122), and other means that are designated by the set-top box 106 directly (e.g., all new users should have a full synopsis of "must see segments" that occur in this episode). In this embodiment, the synopsis may be longer in duration than the current media presentation on the main display 110. Similarly, other embodiments (e.g., an interactive display on the mobile device 120,122) allow the second user to generate a synopsis that is longer in duration than the currently active content on display 110.

Method 300 provides a procedure for determining a presentation type of a synopsis and appropriate timing for presenting the synopsis. Other embodiments are contemplated as well. For example, the synopsis can be determined by way of an interactive interface in the form of a graphical user interface presented at the display of the portable communication device. The interactive interface can enable the second user to move, for example, vertical bars that define a starting point and an ending point within the missed portion for generating the synopsis. While moving the vertical bars, the second user can be presented still images of the missed portion to enable the second user to assess an appropriate start and finish within the missed portion. Alternatively, the system can synchronize the exact finishing point that corresponds to the live program or the time in the program that corresponds to the current media time of the first user. The second user can also move one or both of the vertical bars into a future presentation of the media program. Additionally, the graphic user interface can provide menus for selecting a presentation type (e.g., thumbnail still images with audio, thumbnail video images with audio, thumbnail still images with text description, audio only descriptions, text only descriptions, and so on).

Figure 4:
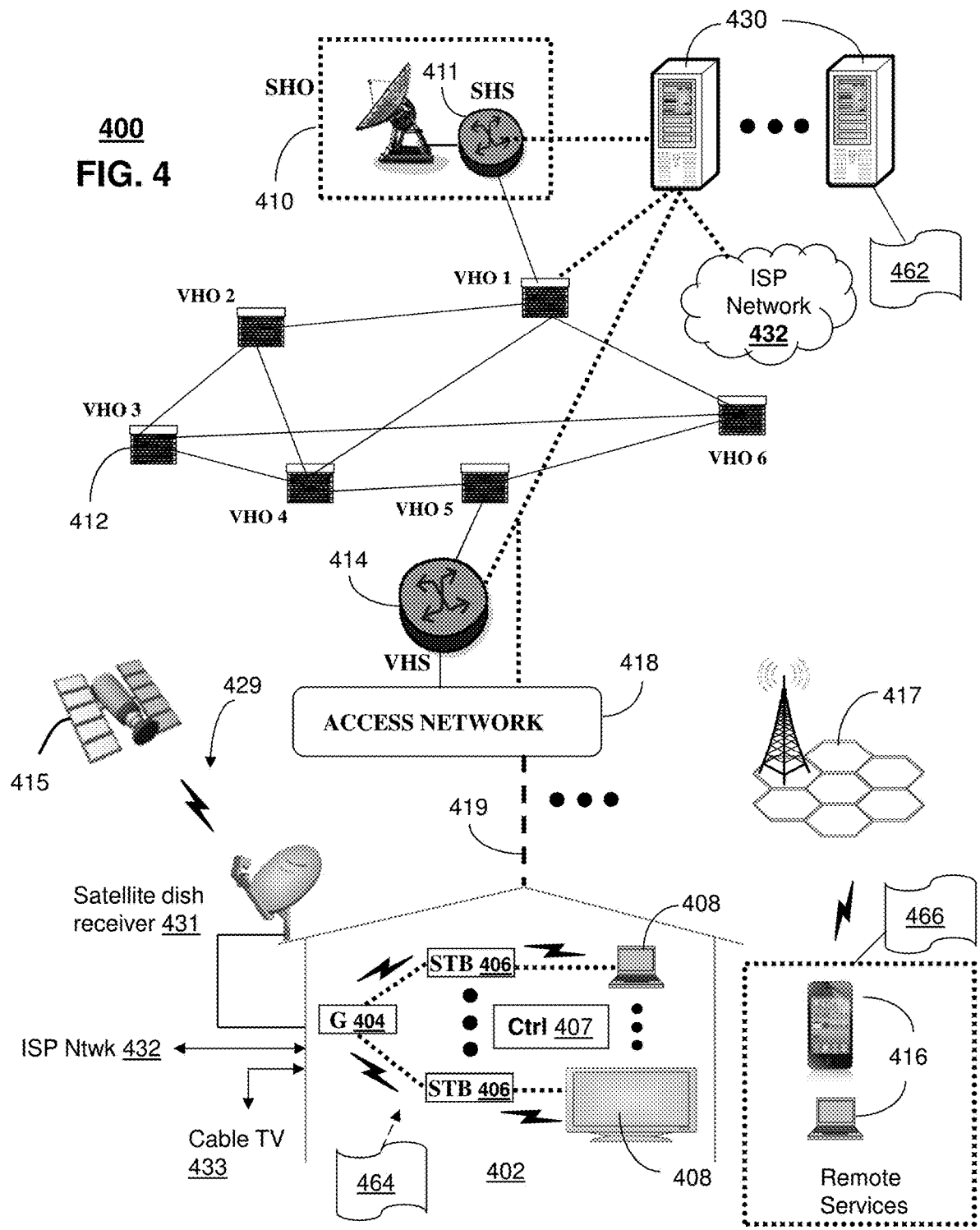
FIGS. 4-5 depict illustrative embodiments of communication systems that provide media services according to the method of FIG. 3.

FIG. 4 depicts an illustrative embodiment of a first communication system 400 for delivering media content. The communication system 400 can represent an Internet Protocol Television (IPTV) media system. Communication system 400 can be overlaid or operably coupled with the systems 100-200 of FIGS. 1-2 as another representative embodiment of communication system 400. Portions of communication system 400 can be configured to perform the embodiments of method 300, such as, for example, generating a summary of a missed portion of a media program, identifying subject matter in a next segment of content in the media program that has not been presented, determining a particular time for presenting the summary according to the subject matter in the next segment of content, and initiating a presentation of the summary at the particular time.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a server or servers (herein referred to as server 430). The server 430 can use computing and communication technology to perform function 462, which can include among other things, generating a summary of a missed portion of a media program, identifying subject matter in a next segment of content in the media program that has not been presented, determining a particular time for presenting the summary according to the subject matter in the next segment of content, and initiating a presentation of the summary at the particular time. The media processors 406 and wireless communication devices 416 can be provisioned with software functions 462 and 466, respectively, to utilize the services of server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
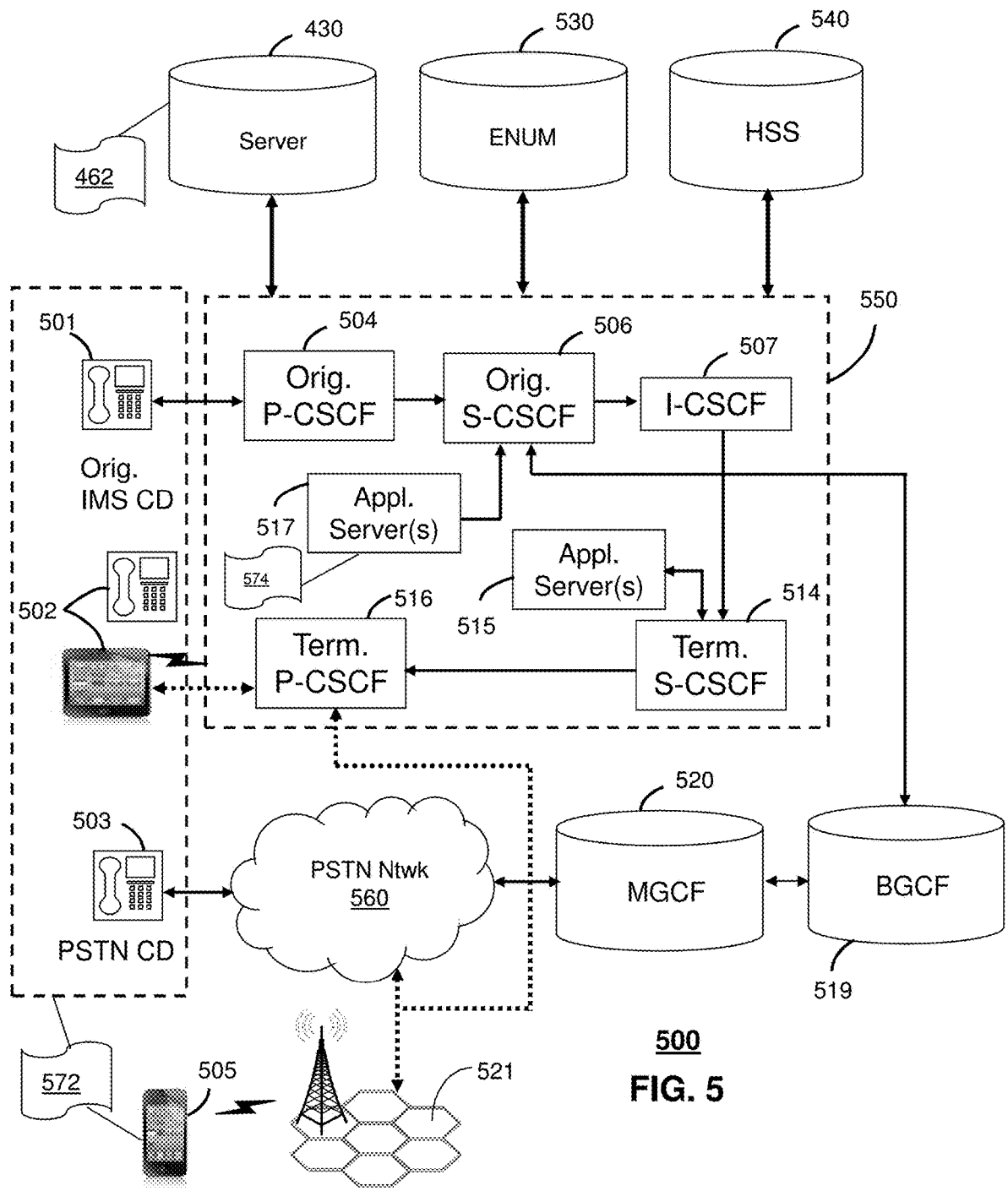

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100-200 of FIGS. 1-2 and communication system 400 as another representative embodiment of communication system 400. Portions of communication system 500 can be configured to perform the steps of method 300 such as, for example, detecting a request for a synopsis of a missed portion of a video program in progress, where the missed portion is determined from a first time when the video program was initiated and a second time when the request for the synopsis is received, identifying a particular time for presenting the synopsis according to subject matter in a next segment of content that has yet to be presented in the video program, and presenting the synopsis at the particular time.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to communication system 500 for purposes similar to those described above. Server 430 can perform function 462 and thereby provide synopsis or summary services to the CDs 501, 502, 503 and 505 of FIG. 5. CDs 501, 502, 503 and 505, which can be adapted with software to perform function 572 to utilize the services of the server 430. Server 430 can be an integral part of the application server(s) 517 performing function 572, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 6:
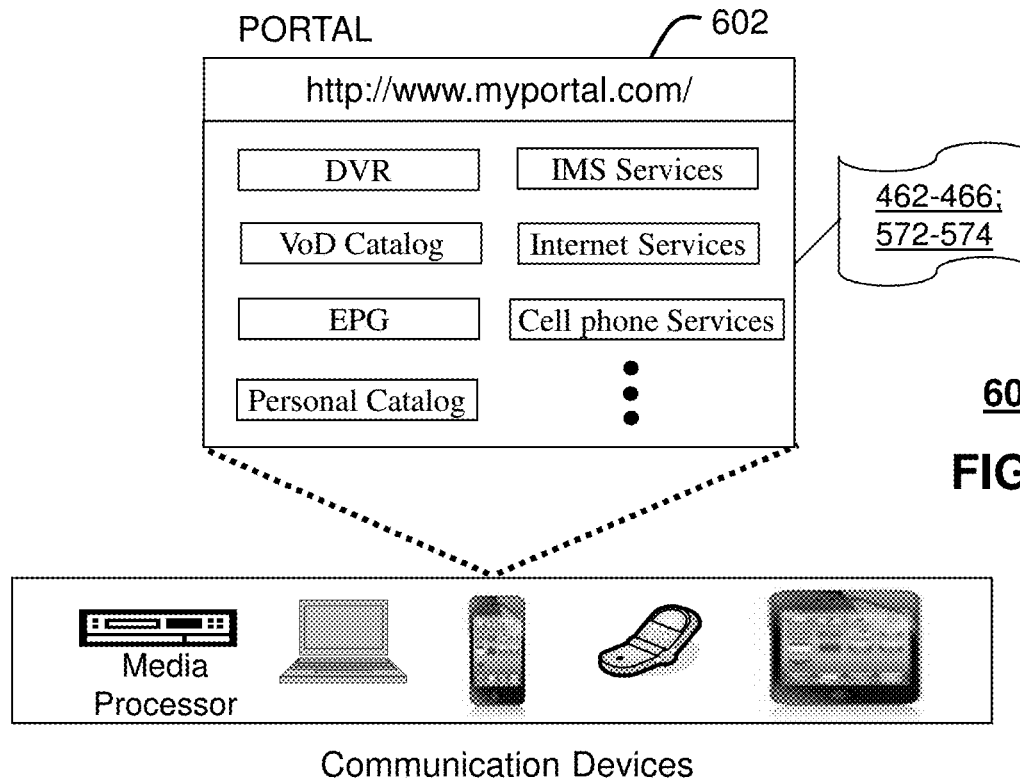
FIG. 6 depicts an illustrative embodiment of a web portal for interacting with the communication systems of FIGS. 1-2, and 4-5.

FIG. 6 depicts an illustrative embodiment of a web portal 602 which can be hosted by server applications operating from the computing devices 430 of the communication system 100 illustrated in FIG. 1. Communication system 600 can be communicatively coupled to systems 100-200, communication 400, and/or communication system 500. Communication system 602 can be used to provision synopsis servers, define user profiles with synopsis preferences, among other things. The web portal 602 can be used for managing services of systems 100-200 and communication systems 400-500. A web page of the web portal 602 can be accessed by a Uniform Resource Locator (URL) with an Internet browser using an Internet-capable communication device such as those described in FIGS. 1-2 and 4-5. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and service providers of communication systems 100-200 and 400-500.

Figure 7:
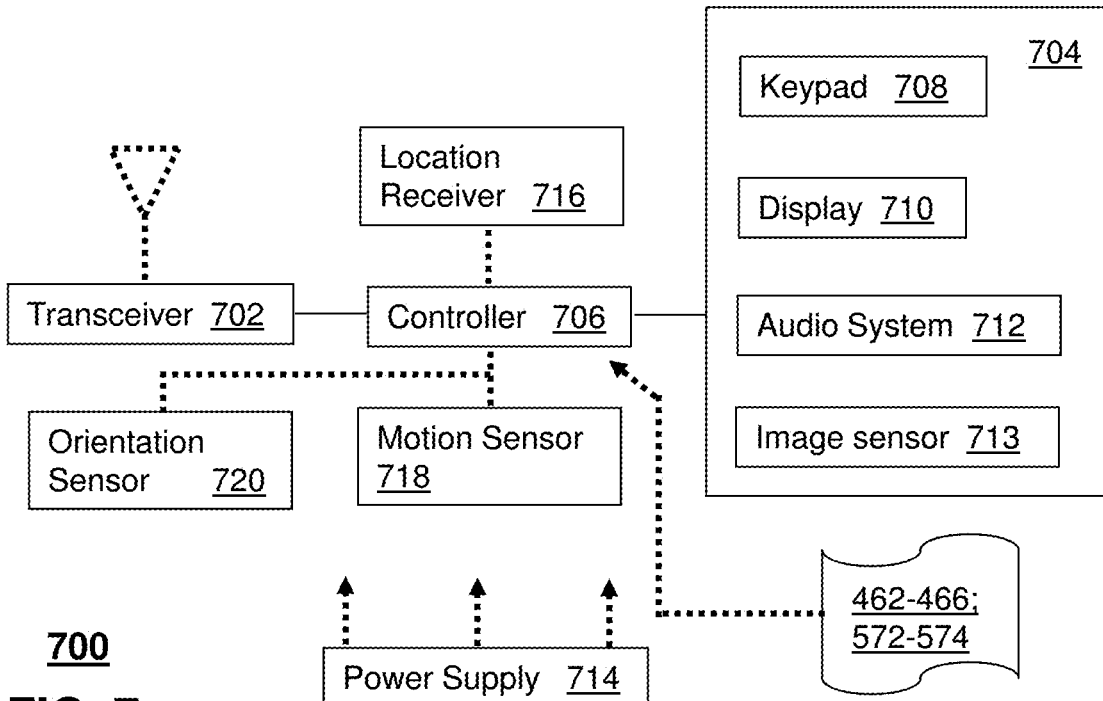
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1-2 and 4-5. Communication device 700 can be configured to perform method 300 in whole or in part. For example, communication device 700 can be configured to perform operations comprising detecting a request for a synopsis of a missed portion of a media program, identifying subject matter in a next segment of content in the media program that has not been presented, determining a particular time for presenting the synopsis according to the subject matter in the next segment of content, and initiating a presentation of the synopsis at the particular time.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 400 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the portable communication devices of FIGS. 1-2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of systems 100-200, communication system 400, and communication system 500. In addition, the controller 706 can be adapted in various embodiments to perform the functions 462-466 and 572-574, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
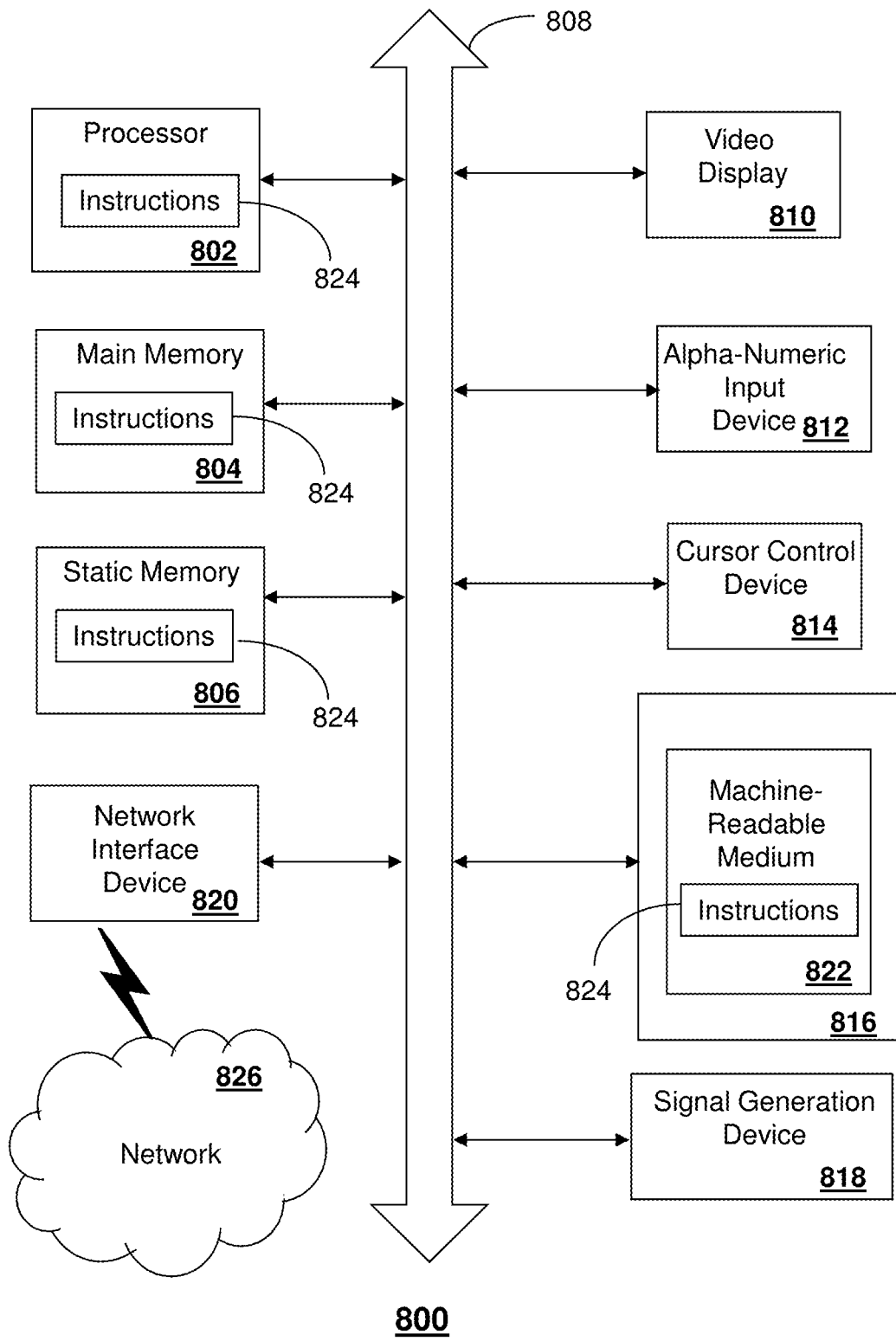
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods describe above. One or more instances of the machine can operate, for example, as the servers 102, the portable communication devices of FIGS. 1-2, server 430, media processor 406, portable communication devices 120, 122, 416, 502, 505, and other devices of FIGS. 1-2 and 4-5. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
downloading media content in response to receiving user-input from a remote controller, wherein the user-input indicates to present the media content on a display communicatively coupled to the device, wherein the device comprises a media processor, wherein the media content was previously recorded;
providing the media content to the display, wherein the display presents the media content to a first user;
receiving a request for a synopsis of a missed portion of a transmission of the media content in progress from a communication device associated with a second user based on the communication device detecting that the communication device is within a communication range of the device, wherein the communication device requests metadata that identifies a genre of the media content, and wherein the communication device submits the request for the synopsis of the missed portion based on the communication device determining that the media content is desirable for viewing by the second user in accordance with a comparison of the genre to user preferences of the second user;
facilitating access to the synopsis of the missed portion;
determining a viewing significance of a next segment of the media content and a priority of the missed portion; and
providing the synopsis to the communication device in response to identifying a particular time for presenting the synopsis according to the viewing significance of the next segment of the media content and the priority of the missed portion.

2. The device of claim 1, wherein the determining of the missed portion comprises determining the missed portion of the transmission of the media content based on an arrival time of the second user in response to determining the arrival time of the second user of the communication device to a viewing area proximate the display.

3. The device of claim 2, wherein the determining of the arrival time comprises determining the arrival time based on a trajectory of the communication device.

4. The device of claim 1, wherein the operations comprise transmitting, over a wireless communication link, the synopsis at the particular time to the communication device for presentation to the second user of the communication device, wherein the synopsis is presented on a display of the communication device.

5. The device of claim 1, wherein the identifying of the particular time comprises identifying the particular time to be after the next segment according to the viewing significance of the next segment being higher than the priority of the missed portion.

6. The device of claim 1, wherein the next segment comprises an advertisement.

7. The device of claim 1, wherein the determining of the priority of the missed portion comprises determining the priority of the missed portion according to a length of the missed portion.

8. The device of claim 1, wherein the missed portion comprises a plurality of missed segments, wherein each of the plurality of missed segments is associated with a priority, resulting in a plurality of priorities.

9. The device of claim 8, wherein the determining of the priority of the missed portion comprises determining the priority of the missed portion according to the plurality of priorities.

10. A machine-readable storage device, comprising executable instructions that, when executed by a processing system including a processor, facilitate performance of operations comprising:
downloading media content in response to receiving user-input from a remote controller, wherein the user-input indicates to present the media content on a display communicatively coupled to the processing system, wherein the processing system comprises a media processor, wherein the media content was previously recorded;

providing the media content to the display, wherein the display presents the media content to a first user;

receiving a request for a synopsis of a missed portion of a transmission of the media content in progress from a communication device associated with a second user based on the communication device detecting that the communication device is within a communication range of the processing system, wherein the communication device requests metadata that identifies a genre of the media content, and wherein the communication device submits the request for the synopsis of the missed portion based on the communication device determining that the media content is desirable for viewing by the second user in accordance with a comparison of the genre to user preferences of the second user;

determining a viewing significance of a next segment of the media content and a priority of the missed portion; and providing the synopsis to the communication device in response to identifying a particular time for presenting the synopsis according to the viewing significance of the next segment of the media content and the priority of the missed portion, wherein identifying the particular time comprises identifying the particular time to be after the next segment according to viewing significance of the next segment is higher than the priority of the missed portion.

11. The machine-readable storage device of claim 10, wherein the determining of the missed portion comprises determining the missed portion of the transmission of the media content based on an arrival time of the second user in response to determining the arrival time of the second user of the communication device to a viewing area proximate the processing system.

12. The machine-readable storage device of claim 11, wherein the determining of the arrival time comprises determining the arrival time based on a trajectory of the communication device.

13. The machine-readable storage device of claim 10, wherein the operations comprise transmitting, over a wireless communication link, the synopsis at the particular time to the communication device, wherein the synopsis is presented on a display of the communication device.

14. The machine-readable storage device of claim 10, wherein the next segment comprises an advertisement.

15. The machine-readable storage device of claim 10, wherein the determining of the priority of the missed portion comprises determining the priority of the missed portion according to a length of the missed portion.

16. The machine-readable storage device of claim 10, wherein the missed portion comprises a plurality of missed segments, wherein each of the plurality of missed segments is associated with a priority, resulting in a plurality of priorities, and wherein the determining of the priority of the missed portion comprises determining the priority of the missed portion according to the plurality of priorities.

17. A method, comprising:
downloading, by a processing system including a processor, media content in response to receiving user-input from a remote controller, wherein the user-input indicates to present the media content on a display communicatively coupled to the processing system, wherein the processing system comprises a media processor, wherein the media content was previously recorded;

providing, by the processing system, the media content to the display, wherein the display presents the media content to a first user;

receiving, by the processing system, a request for a synopsis of a missed portion of a transmission of the media content in progress from a communication device associated with a second user based on the communication device detecting that the communication device is within a communication range of the processing system, wherein the communication device requests metadata that identifies a genre of the media content, and wherein the communication device submits the request for the synopsis of the missed portion based on the communication device determining that the media content is desirable for viewing by the second user in accordance with a comparison of the genre to user preferences of the second user;

determining, by the processing system, a viewing significance of a next segment of the media content and a priority of the missed portion, wherein the missed portion comprises a plurality of missed segments, wherein each of the plurality of missed segments is associated with a priority, resulting in a plurality of priorities, wherein the determining of the priority of the missed portion comprises determining the priority of the missed portion according to the plurality of priorities; and providing, by the processing system, the synopsis to the communication device in response to identifying, by the processing system, a particular time for presenting the synopsis according to the viewing significance of the next segment of the media content and the priority of the missed portion.

18. The method of claim 17, wherein the identifying of the particular time comprises identifying, by the processing system, the particular time to be after the next segment according to viewing significance of the next segment is higher than the priority of the missed portion.

19. The method of claim 17, wherein the media processor comprises a set-top box.

20. The device of claim 1, wherein the receiving of the request for the synopsis of the missed portion is further based on an acceptance of a prompt presented at the communication device, wherein the prompt provides the second user an option to request the synopsis.

* * * * *